Sept. 27, 1938.  J. A. OBERMAIER  2,131,066
SEALED CONNECTER
Filed Oct. 1, 1934
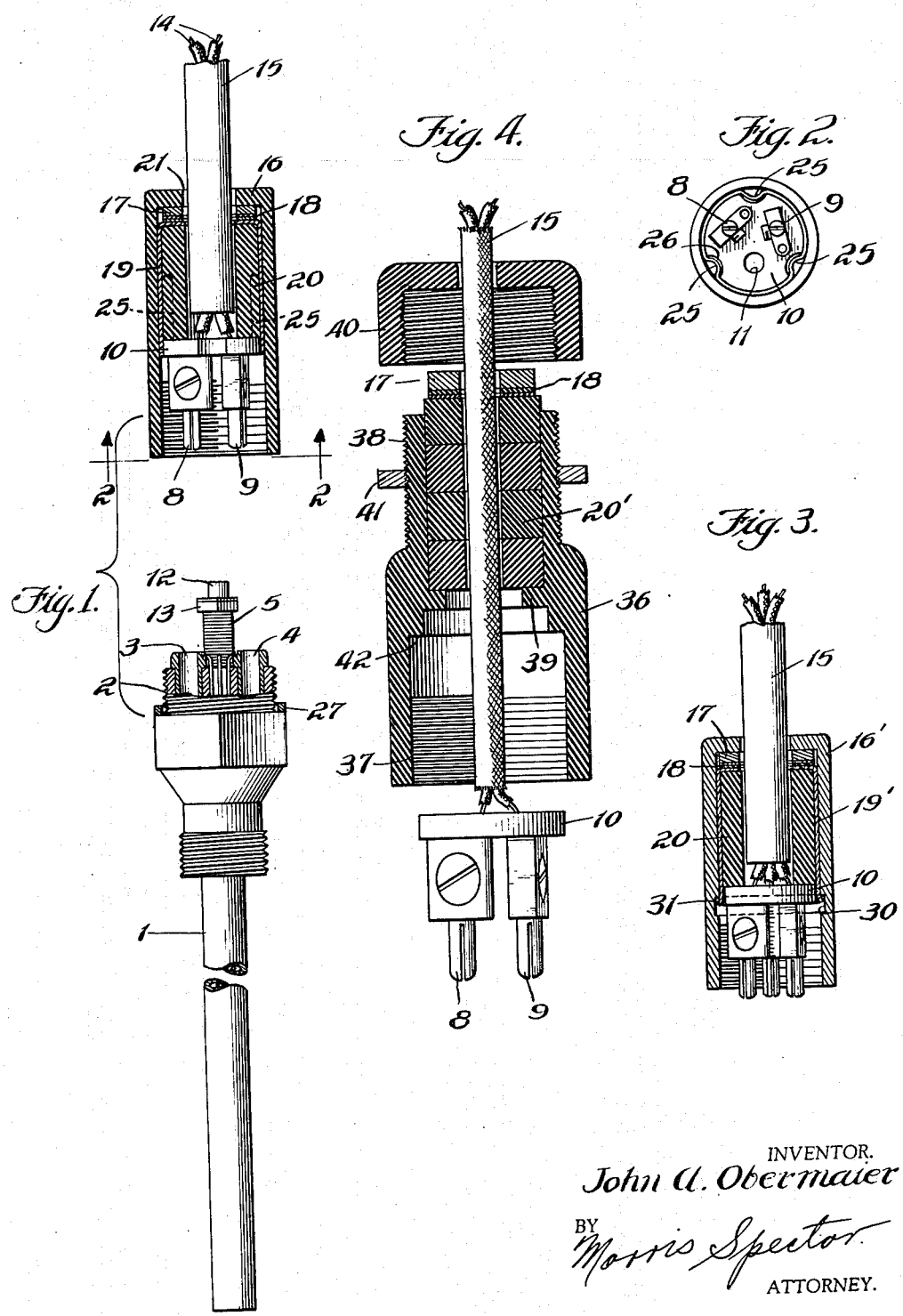
INVENTOR.
John A. Obermaier
BY Morris Spector
ATTORNEY.

Patented Sept. 27, 1938

2,131,066

UNITED STATES PATENT OFFICE 2,131,066

SEALED CONNECTER

John A. Obermaier, Chicago, Ill.

Application October 1, 1934, Serial No. 746,378

12 Claims. (Cl. 201—63)

This application is a continuation in part of my pending application Serial #741,286, filed August 24, 1934. The present invention relates to electric connecters of the plug and socket type and is particularly concerned with the provision of sealing means to prevent the ingress of moisture.

In electric measuring apparatus where minute currents are involved it is necessary that the circuit connections be of a resistance which does not change from time to time except insofar as such change is contemplated in the normal functioning of the apparatus. In cases where a plug and socket type of connecter is used, in a circuit carrying very small currents, a slight change in resistance at the connecter may so alter the characteristics of the circuit as to render the measurement useless. This is especially true in those instances where the measurement is, in effect, a measurement of the change in resistance of an electric element. In such cases the change in resistance of the plug and socket connecter may approach or even exceed the change in resistance of the particular element in which the change is being measured, and therefore the error in the reading may become very large.

Corrosion due to moisture and chemical substances in the air constitutes one of the prime causes for a change in resistance of a plug and socket connecter. It is an object of the present invention to provide a connecter of this type which shall be sealed against the entry of moisture. Because of this seal all foreign corroding matter is excluded from the contacts and, therefore, the contact resistance does not alter.

In a resistance thermometer it is desirable to exclude moisture from the region of the terminal structure even though the moisture does not actually reach the terminals and cannot produce corrosion of the contacts. The presence of moisture in close proximity to one of the terminals may so alter the heat-conducting characteristics of the structure that a temperature difference is set up between the terminals upon a change in the surrounding temperature. Such temperature difference may set up thermo-electric currents which would seriously affect the accuracy of measurement of the resistance upon which the temperature reading is dependent. Thermo-electric currents are set up when a temperature difference exists between the terminals, because the line conductor is generally of metal specifically different from the metal of the terminals.

It is a further object of the present invention to provide a plug and socket type of connecter with cooperating screw-threaded members so related to one another that when they are threaded together they assure the full engagement of the plug and socket contacts and they prevent withdrawal of the plug by pulling on the same.

It is a still further object of this invention to provide a connecter structure wherein the very act of tightening the same on the socket serves to seal the structure against the ingress of moisture or other foreign contamination.

It is another object of the invention to provide a structure of the class described which may be turned with respect to the lead-in conductor to effect a seal against creepage of moisture along the conductor, without producing twisting of the conductor or its surrounding insulation, and which may be backed off without the danger of injuring the conductor insulation.

The attainment of the above and further objects of the present invention will be apparent from the following specification taken in conjunction with the accompanying drawing forming a part thereof.

In the drawing:

Figure 1 is a view, in partial longitudinal section, of a resistance thermometer bulb having a cap of my improved construction, the cap being separated from the rest of the unit to facilitate illustration;

Figure 2 is a view taken along the line 2—2 of Figure 1 and looking in the direction of the arrows;

Figure 3 is a longitudinal section through a modified form of cap structure; and Figure 4 shows another cap structure.

Reference may now be had more particularly to Figures 1 and 2 of the drawing. A resistance thermometer bulb is indicated at 1, terminating in a head or terminal support 2 having a pair of socket terminals 3—4 and a compensating resistor 5. The resistance thermometer bulb is of a construction such as is shown and claimed more particularly in my pending application Serial #741,286, filed August 24, 1934, and, except in combination with the cap and jack structure to be presently described, forms no part of the present invention.

The jack structure comprises a pair of male terminal plugs 8 and 9 that cooperate with the socket terminals 3 and 4. The plugs are riveted on a disc 10 of suitable insulation, such as the material known as "Bakelite". The disc 10 is provided with an opening 11 which receives a projecting portion 12 of the compensating resistor 5. When the plug is fully inserted into the socket, a shoulder 13 on the resistor 5 bears against the disc 10. The circuit to the plugs 8 and 9 is extended by wires 14 of a two-wire conductor 15, over which has previously been strung, in the order named, a cap 16, a rubber gasket 17, a pair of flat metal washers 18, a metal thimble 19 and a gasket 20 in the form of a piece of thick rubber tubing. The conductor 15 is slidable through the tubing 20, and the thimble 19 is slidable through the cap 16 so that, by pushing downwardly on the conductor 15, the contents of the cap 16 may be pushed forward to facilitate insertion of the male terminal plugs 8 and 9 into the sockets 3 and 4. Thereafter the cap 16 is slid downward and threaded on the threads of the head or terminal support 2. This serves to compress the rubber gasket 17 and the rubber tube 20. Compression of the gasket 17 seals against the entrance of moisture, or other impurities, by way of the opening 21 thence by way of the inner surface of the cap 16 and between the cap and the thimble 19 to the connecter. Axial compression of the rubber tube 20 causes it to expand radially into firm engagement with the conductor 15 and thus seal against the entrance of moisture, or other impurities, to the terminal structure by creepage along the surface of the conductor 15.

As the cap 16 is being advanced along the threads of the head 2 it is being rotated while the terminals 8 and 9, and therefore the conductor 15, are not rotated. It is desirable that the tube 20 shall not be rotated as it is compressed into gripping relation to the conductor. This is accomplished by making the thimble 19 non-rotatable with respect to the disc 10. This may be done in any of a number of ways. As shown, I have provided the thimble 19 with three peripherally-spaced longitudinally-extending inward projections or indentations 25 which enter grooves or notches 26 in the disc 10. As shown, these indentations extend slightly more than half of the height of the thimble 19, and enter also into correspondingly spaced notches in the periphery of the tube 20.

As the cap 16 is rotated on the head 2, the plug terminals 8 and 9 being held against rotation by the socket terminals 3 and 4, the thimble 19 is advanced longitudinally but does not rotate. Therefore the compression on the tube 20 is axial compression and there is no tendency for the tube, in gripping the conductor 15, to twist the same. This is of importance not only while the cap 16 is being tightened on the head 2, but also when it is being backed away from the head 2. When the rubber tubing 20 has been compressed against the conductor 15 for a considerable length of time, there is a tendency, under some circumstances, for the rubber tube 20 and the rubberstances, for the rubber tube 20 and the rubberized covering on the conductor 15 to become sweated together as if welded. Any turning force applied to the tube 20 while it is still compressed against the conductor 15 may twist the outer covering of the conductor 15 and cause irreparable injury to the conductor insulation. By my arrangement, whereby all twisting is avoided, the compression between the tubing 20 and the conductor 15 is released before they are moved any appreciable amount with respect to one another. Even then, if the tube 20 and the conductor 15 adhere to one another, they do not have to be separated insofar as concerns the establishment or disestablishment of the electrical connections.

At this point it may be well to mention the function of the two metal washers 18. When the cap is being rotated, the top of the thimble 19 is stationary, or almost so. The rubber gasket 17 is in contact and turns with the cap 16. It is not desired that this gasket be also in contact with the thimble 19 because it would exert a turning force on the thimble. The two washers 18 serve as slip friction members between the turning gasket 17 and the stationary thimble 19. While I have shown two such washers, a single washer may be used if desired. Also, it is possible to omit both washers, with advantage insofar as concerns the sealing action, where the sliding of the rubber washer on the thimble 19 is not objectionable.

It is to be noted that the opening in the rubber gasket 17 is sufficiently large to prevent engagement of the gasket with the conductor 15 even when the gasket is compressed.

A rubber gasket 27 may, if desired, be provided to help seal the joint between the cap 16 and the head 2 where the cap is threaded on the head.

In Figure 3 I have shown a modified form of cap structure. The difference consists essentially in that here the cap 16' is provided with a circular groove 30 on the inside thereof, and the lower end of the thimble 19' is expanded, as indicated at 31, to extend loosely into that groove. This prevents withdrawal of the thimble after insertion and expansion thereof, but allows a limited longitudinal and free rotational movement of the thimble with respect to the cap 16'. By reason of this arrangement the thimble retains the gasket 17 and the washers 18 in the correct order as inserted in the factory, while the terminal structure is being connected to the conductor 15 on the job. In this construction the grooves and notches 25—26 of Figure 1 are omitted, both the disc 10 and the thimble 19 being circular in cross-section. The coefficient of friction between the rubber 20 and the metal 19' is much greater than that between the metal 19' and the material of the cap 16', so that the thimble slides with respect to the cap rather than with respect to the rubber 20.

In Figure 3 I have shown a three-plug terminal structure instead of a two-plug structure as in Figure 1. Either may be used interchangeably as required.

In Figure 4 I have shown a modified form of cap structure to be used in lieu of the caps shown in Figures 1 and 3. The cap or terminal holder is indicated by the reference numeral 36 and comprises a piece of "Bakelite", or other suitable insulation, molded to the shape shown. It has a fore part 37 adapted to thread on the terminal support 2, and it is provided with an elongated externally-threaded circular rear projection 38 into which is placed one or more pieces of tubing 20', comprising gaskets. The gaskets 20' rest on an internal shoulder 39 and are compressible by downward movement of the thimble. Two disc washers 18 and a rubber gasket 17 are placed on top of the gasket 20', and the entire unit is assembled by a nut 40 that constitutes a second cap and threads over the projection 38. When the gaskets 20' are not compressed, the conductor 15 may be moved longitudinally in the assembly. Thereafter a terminal structure, such as shown in Figures 1 or 3, may be connected to the wires of the conductor 15.

The length of the fore part 37 is such that a shoulder 42 will just engage the top of the disc 10 when the cap is threaded on the head 2 and the prongs 8 and 9 are fully inserted into the sockets 3 and 4. Therefore, as the cap is advanced on the head 2 it will serve to force the plugs fully into the sockets if they have not previously been fully inserted. Thereafter the nut 40 is tightened to seal the cap, and it is locked in place by a lock nut 41.

To remove the cap from the terminal head 2 the lock nut 41 is first loosened, then the nut 40 is backed away to release the pressure between the gaskets 20' and the conductor 15, and thereafter the cap is turned off of the terminal head 2.

In compliance with the requirements of the patent statutes I have shown and described a few preferred embodiments of my invention. It is, however, to be understood that the invention is not limited to the precise structures shown, the same being merely illustrative. What I consider new and desire to secure by Letters Patent is:

1. An electrical connecter of the plug and socket type including a plug terminal and a cooperating socket terminal, a disc of insulation, one of said terminals being mounted on the disc and located on one side thereof, a sealing ring of resilient material on the other side of the disc, a lead-in conductor extending through the ring to the disc mounted terminal, said sealing ring embracing the conductor but freely slidable with respect thereto, and means for compressing the sealing ring into sealing engagement with the conductor, comprising a rotatable cap embracing the ring and the terminals and means for preventing twisting movement of the sealing ring with respect to the conductor as the cap is rotated.

2. An electrical connecter of the plug and socket type including a plug terminal and a cooperating socket terminal, a disc of insulation, one of said terminals being mounted on the disc and located on one side thereof, a sealing ring of resilient material on the other side of the disc, a lead-in conductor extending through the ring to the disc mounted terminal, said sealing ring embracing the conductor closely but freely slidable with respect thereto, and means for compressing the sealing ring axially towards the disc to expand the sealing ring radially into sealing engagement with the conductor, said means comprising a rotatable cap and means comprising a thimble for preventing twisting movement of the sealing ring with respect to the conductor as the cap is rotated, said thimble being interposed between the sealing ring and the cap and having a higher coefficient of friction with the material contacting it on its inner side than with the material contacting it on its outer side.

3. An electrical connecter of the plug and socket type including a plug member and a socket member, a conductor electrically connected to one of said members, a resilient sealing member surrounding the conductor and permitting free movement of the conductor relative to the sealing member, said sealing member being radially expansible into sealing relationship to the conductor by axial compression, means for axially compressing the sealing member into firm sealing engagement with the conductor, said compressing means comprising a screw-threaded rotatable cap member and means for locking the sealing member against turning with respect to the conductor upon rotation of the cap member.

4. An electrical connecter of the plug and socket type including a plug terminal and a socket terminal, cooperating screw-threaded members associated with the respective terminals and having threaded engagement with one another, and including means for forcing the plug and socket terminals together in response to the threading of the threaded members together, at least one of said threaded members being rotatable independent of rotation of its associated terminal, whereby the threaded members may be threaded together without turning either terminal, an insulated conductor extending through said rotatable threaded member to the associated terminal and non-rotatable with respect to that associated terminal, and means for establishing a liquid tight seal between the conductor and the rotatable threaded member comprising a yielding ring embracing the conductor and pressed into sealing engagement therewith by tightening of the threaded members.

5. An electrical connecter of the plug and socket type including a plug terminal and a socket terminal, cooperating screw-threaded members associated with the respective terminals and having threaded engagement with one another, and including means for forcing the plug and socket terminals together as the threaded members are threaded together, at least one of said threaded members being rotatable independent of rotation of its associated terminal, whereby the threaded members may be threaded together without turning either terminal, an insulated conductor extending through said rotatable threaded member to the associated terminal, and means for establishing a liquid tight seal between the conductor and the rotatable threaded member, said sealing means including a yielding ring embracing the conductor and pressed into sealing engagement therewith, and means between the ring and the associated screw threaded member for preventing twisting of the insulation on the conductor during the establishing and disestablishing of the liquid tight seal.

6. An electric connecter including a cap, a thimble within the cap, a sealing gasket between the end of the thimble and the cap, cooperating means between the cap and the thimble for preventing withdrawal of the thimble from the cap while permitting free rotational and limited longitudinal movement of the thimble with respect to the cap, whereby the thimble holds the sealing gasket in the cap, and a second sealing gasket fitting snugly within the thimble, said gaskets, cap and thimble having aligned conductor receiving openings therein.

7. A removable connecter assembly for an electrical unit having a head structure including two terminal members and a compensating resistance member, said connecter assembly including a second pair of terminals movable into and out of engagement with the first-mentioned terminals, a support on which the second pair of terminals are mounted, sealing gasket means bearing on said support, a conductor extending through the sealing gasket means and connected to said second pair of terminals, means for pressing said gasket against said support to expand the gasket into sealing engagement with the conductor, the support resting on the being supported by the second-mentioned pair of terminals and the compensating resistance member to resist distortion of the support by the pressure of the gasket.

8. A removable connecter assembly for an electrical unit having a head structure including two terminal members and a compensating resistance member, said connecter assembly including a second pair of terminals movable into and out of engagement with the first-mentioned terminals, a support on which the second pair of terminals are mounted, sealing gasket means bearing on said support, a conductor extending through the sealing gasket means and connected to said second pair of terminals, means for pressing said gasket against said support to expand the gasket into sealing engagement with the conductor, the support resting on and being supported by the second-mentioned pair of terminals and the compensating resistance member to resist distortion of the support by the pressure of the gasket; the means for pressing the gasket against the support comprising a cap having screw-threaded engagement with the head structure and adapted to compress the gasket axially as the cap is advanced on the head structure, whereby the gasket is expanded radially into sealing engagement with the conductor, and means interposed between the cap and the gasket for inhibiting turning of the gasket as the cap is advanced on the head structure.

9. An electrical connecter including a cap member, a thimble within the cap member, a sealing gasket between the end of the thimble and the cap member, said thimble being longitudinally movable and freely rotatable with respect to the cap member, a second gasket within the thimble, said gaskets, thimble and cap having aligned conductor receiving openings, a conductor extending through said openings, terminal means at the end of the conductor on the end thereof adjacent the thimble and including a support adapted to bear against the second gasket as the terminal means is forced into circuit closing position, whereby the thimble compresses the first-mentioned gasket towards the cap upon forcing of the cap towards the support, to seal against the creepage of moisture into the cap at the conductor receiving opening thereof, and the second-mentioned gasket is compressed into sealing engagement with the conductor.

10. An electrical connecter including a cap member, a thimble within the cap member, a sealing gasket between the end of the thimble and the cap member, said thimble being longitudinally movable and freely rotatable with respect to the cap member, a second gasket within the thimble, said gaskets, thimble and cap having aligned conductor receiving openings, a conductor extending through said openings, terminal means at the end of the conductor on the end thereof adjacent the thimble and including a support adapted to bear against the second gasket as the terminal means is forced into circuit closing position, whereby the thimble compresses the first-mentioned gasket towards the cap upon forcing of the cap towards the support, to seal against the creepage of moisture into the cap at the conductor receiving opening thereof, and the second-mentioned gasket is compressed into sealing engagement with the conductor, said thimble and said terminal means having cooperating means for holding the thimble non-rotatable with respect to the terminal means as the cap is being rotated.

11. An electric connecter including a cap, a thimble within the cap, a sealing gasket between the end of the thimble and the cap and a second sealing gasket fitting snugly within the thimble, said gaskets, cap and thimble having aligned conductor receiving openings therein.

12. An electric connecter including a cap, a thimble within the cap, a sealing gasket between the end of the thimble and the cap, cooperating means between the cap and the thimble for preventing withdrawal of the thimble from the cap whereby the thimble holds the sealing gasket in the cap, and a second sealing gasket fitting snugly within the thimble, said gaskets, cap and thimble having aligned conductor receiving openings therein.

JOHN A. OBERMAIER.

CERTIFICATE OF CORRECTION.

Patent No. 2,131,066. September 27, 1938.

JOHN A. OBERMAIER.

It is hereby certified that error appears in the printed specification of the above numbered patent requiring correction as follows: Page 3, second column, line 64, claim 7, for "the" first occurrence, read and; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.